United States Patent
Hakamada et al.

[11] 3,902,087
[45] Aug. 26, 1975

[54] ROTOR FOR SQUIRREL-CAGE INDUCTION MOTOR

[75] Inventors: Takeshi Hakamada; Ikushi Kanoh; Toshikazu Narahara, all of Hitachi, Japan

[73] Assignee: Hitachi, Ltd., Japan

[22] Filed: Sept. 30, 1974

[21] Appl. No.: 510,743

[30] Foreign Application Priority Data
Oct. 1, 1973  Japan.............................. 48-109355

[52] U.S. Cl............... 310/211; 260/37 EP; 310/212
[51] Int. Cl. ............................................ F16c 33/00
[58] Field of Search......... 260/37 EP; 310/211, 212, 310/125, 43

[56] References Cited
UNITED STATES PATENTS

| | | | |
|---|---|---|---|
| 2,138,661 | 11/1938 | Maxwell........................... | 310/211 X |
| 2,200,126 | 5/1940 | Smith................................ | 310/211 |
| 2,304,067 | 12/1942 | Anderson......................... | 310/211 X |
| 3,793,236 | 2/1974 | Ashida et al. ................. | 260/2.5 AW |

*Primary Examiner*—Lewis T. Jacobs
*Attorney, Agent, or Firm*—Craig & Antonelli

[57] ABSTRACT

A rotor for a squirrel-cage induction motor in which a thermosetting resin consisting essentially of a polyfunctional epoxy compound and a polyfunctional isocyanate compound and containing a catalyst which forms an isocyanurate ring and an oxazolidone ring has been impregnated between the slot of a rotor iron core and a rotor bar to bond the rotor bar to the slot. The rotor shows excellent adhesive strength between the slot and the rotor bar particularly at high temperatures and thereby can prevent the vibration produced between the slot and the rotor bar.

3 Claims, 6 Drawing Figures

3,902,087
FIG. 1
FIG. 2
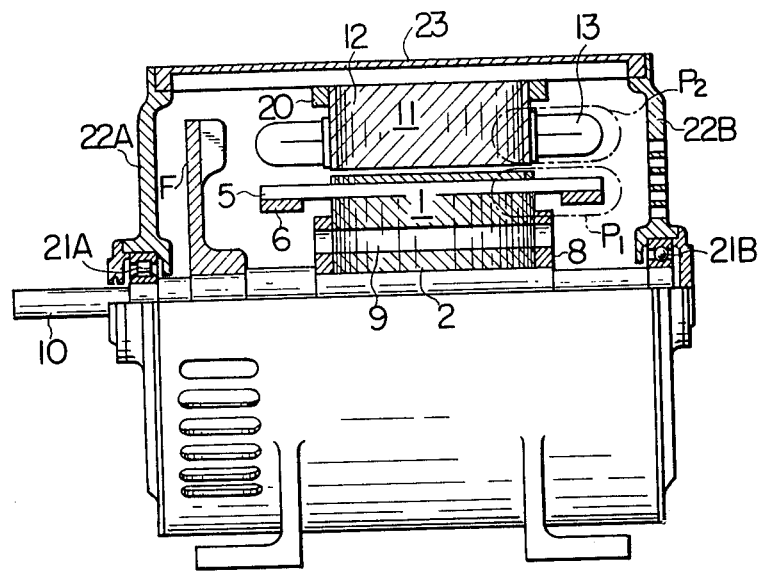
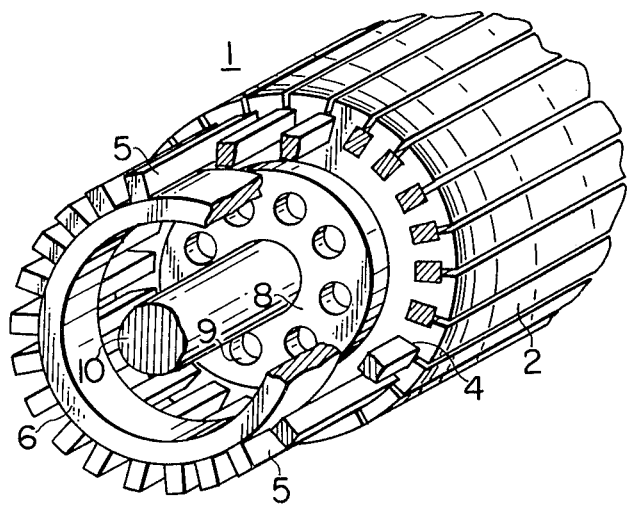

ROTOR FOR SQUIRREL-CAGE INDUCTION MOTOR

The present invention relates to a rotor for a squirrel-cage induction motor. More particularly, the invention pertains to a rotor for a squirrel-cage induction motor which can reduce a noise accompanied by mechanical vibration and prevent the damage of the rotor bars and iron core of the rotor.

A rotor for a squirrel-cage induction motor is generally produced by constituting a rotor iron core by laminating thin silicon steel plates stamped out by, for example, a press to a required thickness, inserting a rotor bar into a plurality of slots provided in the rotor iron core, respectively, and then connecting the ends of the respective rotor bars with one another by a short-circuit ring.

The slots into which a rotor bar is inserted are punched simultaneously with the stamping out of said silicon steel plate. Therefore, slots are formed along the lamination direction by laminating the silicon steel plates stamped out. However, it is unavoidable that the inside of said slots is not smooth but fine unevenness is present in the laminating direction since the slots are formed by the above-mentioned procedure. It is very difficult owing to an error in the stamping out of the silicon steel plates and an error in the lamination of the silicon steel plates to laminate silicon steel plates of all of the same shape so that they may accord with one another completely. This is the reason why said unevenness occurs when the silicon steel plates are laminated.

Since it is thus unavoidable that the inside of the slots is uneven, the size of the slots should be determined so that it may be sufficiently larger than the section of the rotor bars to be inserted. Therefore, a space is necessarily produced between the rotor bar and the slot. It is originally desirable that the rotor bar is in close contact with the slot without forming a space between them. If there is a space between the rotor bar and the slot, the rotor bar is easy to vibrate in the slot when the motor is operated and an electromagnetic force acts on the rotor bar. Further, the rotor bar moves finely in the slot when the rotor is rotated, and it appears as vibration.

A mechanical noise is produced together with such vibration. Also, the rotor bar is violently struck by the unevenness in the slot. After a long period of time elapsed, the rotor bars and the silicon steel plates forming the inner surface of the slots may be broken owing to fatigue of materials.

Therefore, it is desirable that there is not present between the rotor bar and the slot such a space as the rotor bar becomes movable. However, it is unavoidable that a space is formed between the rotor bar and the slot since the rotor bar must be inserted into the slot.

As a measure to meet the situation, it has been proposed to suppress the movement of the rotor har by impregnating an adhesive between the rotor bar and the slot to bond them. However, said adhesive must preserve a sufficient adhesive strength even at a temperature as high as about 200°C, since the rotor bar which is the secondary conductor of a squirrel-cage induction motor receives about five times the rated current on starting and is heated to 200°C on its surface by Joule heat.

As such a heat-resistant adhesive, for example, polyimide resins (180° – 250°C) and silicone resins (180° – 315°C), etc. are known, but these resins have defects that their adhesive strength is poor or their impregnating property is insufficient although they are heat-resistant.

The adhesive strength of silicone resins is as low as 35 kg/cm$^2$ and polyimide resins have a very high viscosity at ordinary temperature and thereby are very difficult to impregnate. The adhesive for impregnating the rotor iron core and the rotor bar must have an adhesive strength of 200 kg/cm$^2$ or more in order to attain the above-mentioned object. Also, it must have a low viscosity at ordinary temperature in order to facilitate impregnating operation and not to reduce the life of the adhesive. Therefore, the above-mentioned resins are not suitable for the use for this object.

An object of the present invention is to provide a rotor for a squirrel-cage induction motor which can suppress the vibration produced in its iron core and rotor bars during operation.

Another object of the invention is to provide a rotor for a squirrel-cage induction motor which can reduce noise during operation.

Another object of the invention is to provide a rotor for a squirrel-cage induction motor in which the damage of its rotor bars does not occur.

A still further object of the invention is to provide a rotor for a squirrel-cage induction motor in which the breakage of silicon steel plates does not occur around a slot.

Other objects and advantages of the present invention will be apparent from the description taken in conjunction with the accompanying drawings.

The present invention is characterized by impregnating a thermosetting resin consisting essentially of a polyfunctional epoxy compound and a polyfunctional isocyanate compound and containing a catalyst which forms an isocyanurate ring and an oxazolidone ring between a rotor bar and a slot to bond them.

FIG. 1 is a side view (containing a partial vertical sectional view) of a squirrel-cage induction motor.

FIG. 2 is a rough sketch (containing a partial sectional view) of a rotor for a squirrel-cage induction motor.

The present invention will be explained in detail referring to the accompanying drawings.

Figure 3:
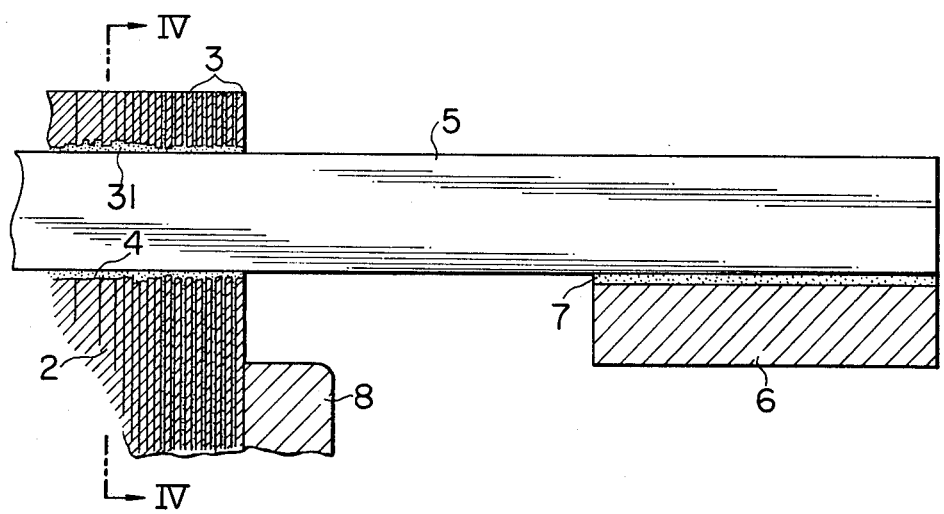
FIG. 3 is an enlargement of part $P_1$ in FIG. 1.
Figure 4:
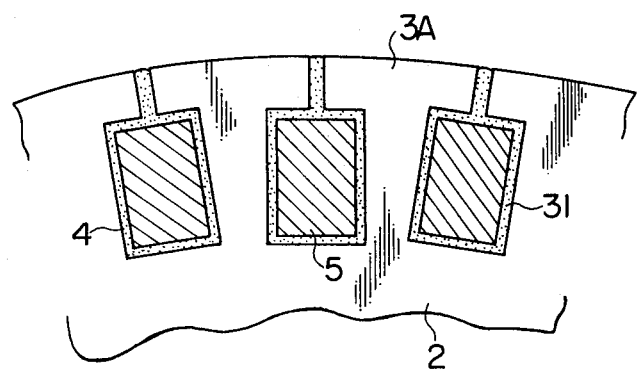
FIG. 4 is a sectional view taken along line IV—IV in FIG. 3.
Figure 5:
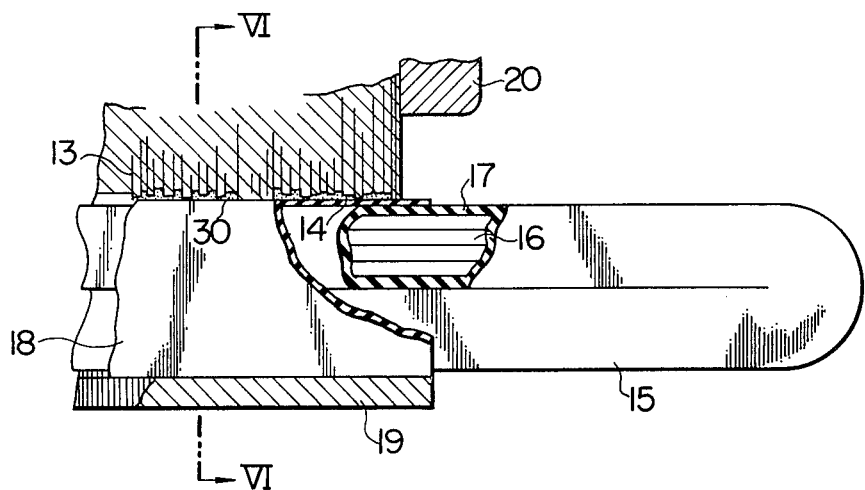
FIG. 5 is an enlarged sectional view of part $P_2$ in FIG. 1.
Figure 6:
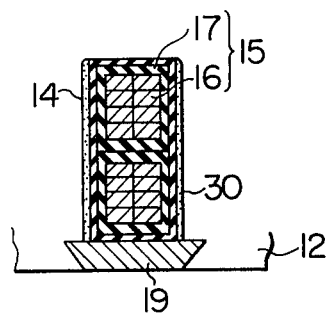
FIG. 6 is a sectional view taken along line VI—VI in FIG. 5.

A squirrel-cage induction motor is shown in FIGS. 1 – 6. The squirrel-cage induction motor is made up of a rotor 1 and a stator 11. The rotor 1 is made up a rotor iron core 2 formed by laminating silicon steel plates 3, rotor bars 5 inserted into slots 4 provided on the outer diameter side of the rotor iron core 2 in the lamination direction, a shortcircuit ring 6 connected by silver solder 7 with the ends of the rotor bars 5 for connecting electrically the respective ends of the rotor bars with one another, and a fastening plate 8 positioned at the inner diameter portion on the both ends of the rotor iron core 2 for fastening the iron core in the lamination direction. The rotor 1 is fixed on a rotating axis 10 together with parts such as a ventilator fan F. Also, vent holes 9 are provided in the rotor iron core 2 and the fastening plates 8 extending in the axial direction.

Also, the stator 11 is, like the rotor 1, made up of a stator iron core 12 formed by laminating silicon steel plates 13, a stator winding 15 inserted into a slot 14 provided on the inner diameter side of the stator iron core 12 in the lamination direction and a fastening plate 20 for fastening the stator iron core 12 in the lamination direction. The stator 11 having this construction is supported by a stator frame 23. Said rotating axis 10 is supported by brackets 22A and 22B installed at the ends of the stator frame 23 by bearings 21A and 21B so that the rotor iron core 2 and the stator iron core 12 may face each other. Said stator winding 15 made up of a winding conductor 16 and an insulating layer 17 covering the winding conductor 16 is inserted into said slot 14 through a slot liner 18 and is supported by a wedge 19.

The slots 4 and 14 for inserting the rotor bars 5 and the stator winding 15, respectively, are formed so that they may be larger than the section of the rotor bar 5 or the stator winding 15, since the inside of the slots is uneven. Therefore, a space is produced between the rotor bar 5 and the slot 4 and the stator winding 15 and the slot 14, respectively. Also, as the rotor iron core 2 and the stator iron core 12 are fastened by the fastening plates 8 and 20 at the lamination end on the inner diameter side and at the lamination end on the outer diameter side, respectively, the silicon steel plates 3 of the rotor iron core 2 at the lamination end on the outer diameter side and the silicon steel plates 13 of the stator iron core 12 at the lamination end on the inner diameter side open toward the fastening plates 8 and 20 owing to insufficient fastening force.

The vibration of the rotor bars 5 and the stator winding 15 within the slots 4 and 14, respectively, and the vibration of the rotor iron core 2 and the stator iron core 12 at the lamination end have a bad influence. Therefore, it is necessary to get rid of any vibration space and prevent the opening of the silicon steel plates 3 and 13. It is necessary therefor to fill and cure an adhesive into the vibration space or to bond the adjoining silicon steel plates 3 or 13 positioned at the lamination end of the rotor iron core 2 or the stator iron core 12 with an adhesive.

As a sharp increase in temperature does not occur on the stator 11 side on starting, the vibration generated in the stator 11 can be suppressed by impregnating an adhesive 30 such as a conventional epoxy resin between the stator winding 15 and the slot 14 and impregnating the adhesive around the slot of the silicon steel plates 13 positioned at the lamination end of the stator iron core 12.

On the other hand, as described above, in the rotor a very large electric current flows through the rotor bars 5 and the rotor 1 side is heated to a considerably high temperature on starting. Therefore, an adhesive which shows excellent adhesive strength at a high temperature is required.

According to the present invention, a novel thermosetting resin 31 consisting essentially of a polyfunctional epoxy compound and a polyfunctional isocyanate compound and containing a catalyst which forms an isocyanurate ring and an oxazolidone ring is impregnated between the rotor bar 5 of the rotor 1 and the slot 4 and around the slots of the silicon steel plates 3 positioned at the lamination end of the rotor iron core 2.

The novel thermosetting resin is cured to form a resin containing as as recurring unit at least two isocyanurate rings bonded directly to one another through an isocyanate residue and two oxazolidone rings bonded directly to each other through an epoxy residue and represented by the general formula,

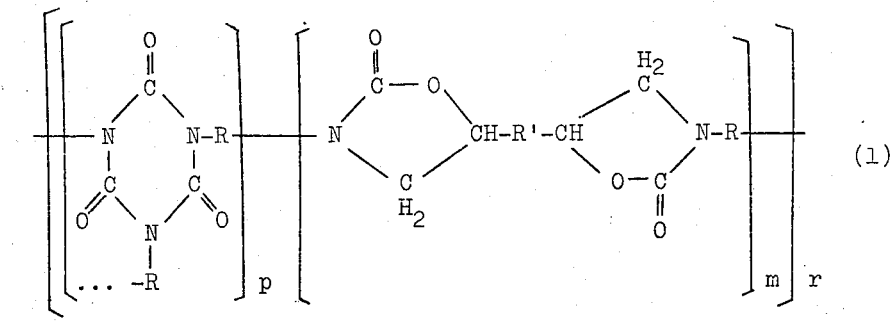

wherein R is an isocyanate residue, R' is an epoxy residue, $p$ is an integer of at least 2, and $m$ and $r$ each are integers of at least 1.

By bonding the slot 4 and the rotor bar 5 and further bonding the silicon steel plates 3 with one another by the use of this novel thermosetting resin, excellent adhesive strength can be obtained even at high temperatures and excellent effects which could not be attained with any prior art epoxy resin can be produced.

The detailed characteristic properties of such thermosetting resins are described in U.S. Pat. application Ser. No. 418,905.

In order that these thermosetting resins have thermal resistance of 180°C or more and strong adhesive strength, 2 – 3.5 equivalents of a polyfunctional isocyanate compound is blended with 1 equivalent of a polyfunctional epoxy compound, a catalyst which forms an isocyanurate ring and an oxazolidone ring is added, and the mixture is impregnated and cured between said slot 4 and the rotor bar 5 as well as between the silicon steel plates 3. In general, the curing is carried out by heating at a temperature of up to 130°C, and preferably of about 80°C, for 5 – 15 hours, and then heating at a temperature of 150°C or more for 5 – 15 hours.

At a temperature of up to 130°C, an isocyanurate ring is formed mainly by the trimerization of the isocyanate. By heating at a temperature of 150°C or more, the isocyanate compound having the said isocyanurate ring is reacted with the epoxy compound to form an oxazolidone ring and cross linkage and curing occur. By using a heat-resistant adhesive obtained by curing such a thermosetting resin, the slot and the rotor bar are tightly bonded or the silicon steel plates are tightly bonded to one another and neither release nor delamination occur even at high temperatures. In order to obtain thermal resistance of class H (180°C) or more, it is desirable to blend 2 – 3.5 equivalents of the isocyanate with 1 equivalent of the epoxide, as described above.

As the polyfunctional epoxide of the present invention, there can be used bifunctional epoxides such as, for example, diglycydylether of bisphonol A, butadiene diepoxide, 3,4-epoxycyclohexylmethyl-(3,4-epoxy)-cyclohexane carboxylate, vinylcyclohexene dioxide, 4,4'-di(1,2-epoxyethyl)diphenylether, 4,4'-di(1,2-epoxyethyl)biphenyl, 2,2-bis(3,4-epoxycyclohexyl)-propane, diglycydylether of resorcinol, diglycydylether of phloroglucinol, diglycydylether of methylphloroglucinol, bis(2,3-epoxycyclopentyl)ether, 2-(3,4-epoxy)cyclohexane-5,5-spiro(3,4-epoxy)-cyclohexane-m-dioxane, bis-(3,4-epoxy-6-methylcyclohexyl)adipate, N,N'-m-phenylenebis(4,5-epoxy-1,2-cyclohexanedicarboxyimide) and the like; and tri- or more functional epoxy compounds much as triglycydylether of paraminophenol, polyallylglycydylether, 1,3,5-tri(1,2-epoxyethyl)benzene, 2,2',-4,4'-tetraglycydoxybenzophenone, tetraglycydoxytetraphenylethane, polyglycydylether of phenolformaldehyde novolac, triglycydylether of glycerol, triglycydylether of trimethylolpropane and the like. With respect to the other epoxy compounds, a book entitled "Epoxy Resins" (American Chemical Society, 1970) written by Henry Lee and a book entitled "Handbook of Epoxy Resin" (McGraw-Hill Book Co., 1967) written by Henry Lee and K. Neville contain the descriptions of the resins.

Among the aforesaid polyfunctional epoxides, the diglycydylether of bisphenol A and the polyglycydylether of phenol-formaldehyde novolac have a particullar good reactivity. Therefore, they are usuful compounds. Further, the halides of these compounds can be used, too.

Further, as polyfunctional isocyanates, there can be used bifunctional isocyanates, such as, for example, methane diisocyanate, butane-1,1-diisocyanate, ethane-1,2-diisocyanate, butane-1,2-diisocyanate, transvinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethyl-pentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilanediisocyanate, diphenylsilanediisocyanate, ω,ω'-1,3-dimethylbenzenediisocyanate, ω,ω'-1,4-dimethylbenzene diisocyanate, ω,ω'-1,3-dimethylcyclohexane diisocyanate, ω,ω'-1,4-dimethylcyclohexane diisocyanate, ω,ω'-1,4-dimethylbenzene diisocyanate, ω,ω'-1,4-dimethylnaphthalene diisocyanate, ω,ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 1-methylebenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfone-4,4'-diisocyanate and the like; and trifunctional or more isocyanates, such as, for example, polymethylenepolyphenylisocyanate, triphenylmethanetriisocyanate, tris(4-phenylisocyanatethiophosphate), 3,3',4,4'-diphenylmethanetetraisocyanate and the like. Further, compounds obtained by masking isocyanic radicals of the aforesaid isocyanates with phenol, cresol and the like can be used, too. The dimers and trimers of these isocyanates are usable, too. Among these isocyanates, 4,4'-diphenylmethane diisocyanate, 2,4-toluene diisocyanate are preferable and useful. The aforesaid epoxides and isocyanates are each used solely or in combination with one another.

A catalyst displays an important role for obtaining the composition of the present invention. Important is a catalyst which forms isocyanurate bonds and oxazolidone bonds at the time of curing. Such a catalyst as above includes morpholine derivatives, such as, for example, N-dodecylmorpholine, butylene dimorpholine, hexamethylene dimorpholine, cyanoethyl morpholine, triazinoethyl morpholine, N-methyl morpholine, N-ethyl morpholine and the like. Further, there are imidazoles as a catalyst, such as, for example, 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 2,4-diamino-6-(2'-methylimidazolyl-1'-)-ethyl-s-triazine, 2,4-diamino-6-(2'-ethylimidazolyl-1'-)-ethyl-s-triazine, 2,4-diamino-6-(2'-undecylimidazolyl-1'-)-ethyl-s-triazine and the like. Among the aforesaid catalysts, imidazole derivatives are particularly effective.

At least one of the aforesaid heterocycle forming catalysts is used within a range of 0.01 to 10% by weight, preferably 0.1 to 2% by weight, based on a mixture of said polyfunctional epoxide and polyfunctional isocyanate.

The impregnation of said thermosetting resins may be carried out under reduced pressure or by dripping. In this case, the thermosetting resins to be impregnated should have a viscosity of 7 poises or less, and preferably of 2 poises or less. If the viscosity exceeds 7 poises, there is the possibility that the resins are not impregnated between the rotor bar 5 and the slot 4 or between the silicon steel plates 3 sufficiently.

The following example illustrates of the application of said thermosetting resins to a rotor according to the present invention. In the example, all parts are expressed by weight unless otherwise indicated.

EXAMPLE

A thermosetting resin consisting of 100 parts of Diepoxide DER-332 (a bisphenol A epoxy resin manufactured by Dow Chemical Corp. in U.S.A., epoxy equivalent 178), 200 parts of Diisocyanate MDI (4,4'-diphenylmethanediisocyanate), 1.5 parts of N-methylmorpholine and 2,550 parts of zirconium silicate powder was dripped into the gap between a rotor bar and a slot of a rotor, which had previously been preheated to 60° – 80°C, while the rotor was rotated, to impregnate said gap sufficiently. The rotor was then heated in a drying oven at 80°C for 15 hours and further at 180°C and 15 hours to cure the thermosetting resin.

The impregnation of said thermosetting resin between the silicon steel plates around the slot positioned on the both sides of the lamination end of a rotor iron core which was not subjected to a sufficient fastening force was carried out by utilizing excess of the thermosetting resin flowed out from the slot when the thermosetting resin was impregnated in the gap between the rotor bar and the slot and by coating the resin separately from the outside circumference of the rotor iron core.

The adhesive cured by the above-mentioned treatment had a bending strength of 615 kg/cm$^2$ at 200°C, an elongation of 1.2% and a heating loss of 0.2% after 100 days.

With an induction motor containing the thus treated rotor, a fly-wheel was then connected and a 15,000 time starting test was carried out. In this case, the moment of inertia of the fly-wheel was set up so that the maximum temperature of the rotor bar increased after starting and re-starting might be 200°C which may be expected for practical motors. Also, the temperature of the rotor bar was returned to 60°C when the electric current was cut off. Repeated operations were carried out between 60°C and 200°C.

As a result, vibration was remarkably reduced and noise was decreased to 85 to 90 decibels. Such reduction in vibration prooves that the bonding between the rotor bar and the slot and the bonding between the silicon steel plates on the both sides of the lamination end of the rotor iron core were carried out strongly. In fact, after the 15,000 time starting test, neither damage nor breakage was found in the rotor bar and the silicon steel plates. The motor used in this example was a 3,150 kilowatts 4-poles squirrel-cage induction motor.

According to the present invention, the rotor bar which may be heated even to 200°C can be strongly bonded to the inside of the slot and the silicon steel plates at the lamination end of the rotor iron core can be strongly bonded to one another by impregnating and curing a thermosetting resin consisting essentially of a polyfunctional epoxy compound and a polyfunctional isocyanate compound and containing a catalyst which forms an isocyanurate ring and an oxazolidone ring in a gap between the slot and the rotor bar and between the silicon steel plates at the lamination end of the rotor iron core. Therefore, the generation of vibration between the rotor bar and the slot and between the silicon steel plates can be prevented even during operation, and thereby noise as the whole squirrel-cage induction motor can be reduced. Further, the damage of the rotor bar or the breakage of the silicon steel plates around the slot caused by such vibration can be obviated.

What is claimed is:

1. A rotor for a squirrel-cage induction motor in which a resin containing as a recurring unit at least two isocyanurate rings bonded directly to one another through an isocyanate residue and two oxazolidone rings bonded directly to each other through an epoxy residue and represented by the formula,

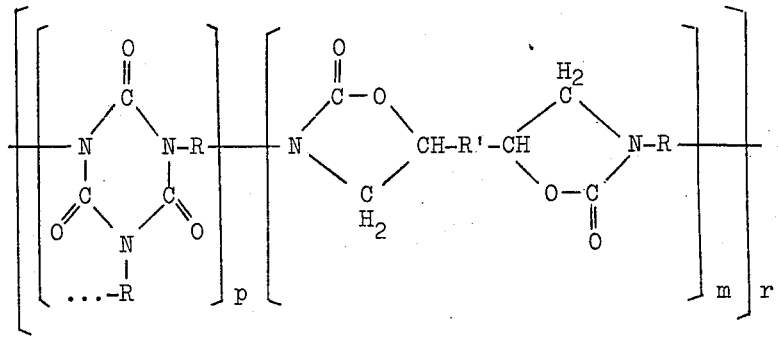

wherein R is an isocyanate residue, R' is an epoxy residue, $p$ is an integer of at least 2, and $m$ and $r$ each are integers of at least 1, has been impregnated into a gap between the slot of a rotor iron core formed by laminating silicon steel plates and a rotor bar inserted into said slot to bond the rotor bar to the slot.

2. A rotor for a squirrel-cage induction motor in which a resin containing as a recurring unit at least two isocyanurate rings bonded directly to one another through an isocyanate residue and two oxazolidone rings bonded directly to each other through an epoxy residue and represented by the formula,

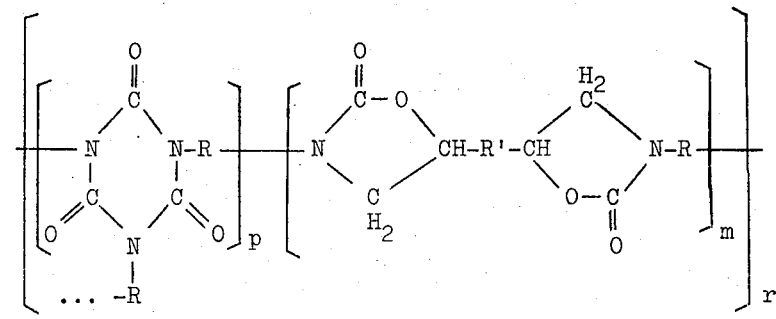

wherein R is an isocyanate residue, R' is an epoxy residue, $p$ is an integer of at least 2 and $m$ and $r$ each are integers of at least 1, has been impregnated into a gap between the slot of a rotor iron core formed by laminating silicon steel plates and a rotor bar inserted into said slot and between the adjoining silicon steel plates positioned at the lamination end of the rotor iron core, respectively, to bond the rotor bar to the slot and bond the adjoining silicon steel plates to one another.

3. A rotor for a squirrel-cage induction motor in which a thermosetting resin consisting of 100 parts by weight of a bisphenol A epoxy resin, 200 parts by weight of 4,4'-diphenylmethanediisocyanate, 1.5 parts by weight of N-methylmorpholine and 2,550 parts by weight of zirconium silicate powder has been impregnated into a gap between the slot of a rotor iron core formed by laminating silicon steel plates and a rotor bar inserted into said slot and between the adjoining silicon steel plates positioned at the lamination end of the rotor iron core, respectively, to bond the rotor bar to the slot and to bond the adjoining silicon steel plates to one another.

* * * * *